US009009635B1

(12) United States Patent
O'Riordan

(10) Patent No.: US 9,009,635 B1
(45) Date of Patent: Apr. 14, 2015

(54) SYSTEM AND METHOD FOR SIMULATOR ASSERTION SYNTHESIS AND DIGITAL EQUIVALENCE CHECKING

(71) Applicant: Cadence Design Systems, Inc., San Jose, CA (US)

(72) Inventor: Donald J. O'Riordan, Sunnyvale, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/887,248

(22) Filed: May 3, 2013

Related U.S. Application Data

(60) Provisional application No. 61/800,142, filed on Mar. 15, 2013.

(51) Int. Cl.
G06F 17/50 (2006.01)

(52) U.S. Cl.
CPC ........ G06F 17/5022 (2013.01); G06F 17/5045 (2013.01); G06F 17/5036 (2013.01); G06F 17/5081 (2013.01)

(58) Field of Classification Search
CPC ............ G06F 17/5081; G06F 17/5022; G06F 17/5036; G06F 17/5045
USPC .................. 716/100–101, 106–107, 110–111
See application file for complete search history.

(56) References Cited

U.S. PATENT DOCUMENTS

| 5,703,788 | A | 12/1997 | Shei et al. | |
|---|---|---|---|---|
| 6,591,402 | B1 * | 7/2003 | Chandra et al. | 716/106 |
| 6,675,310 | B1 * | 1/2004 | Bloom et al. | 713/500 |
| 6,959,271 | B1 * | 10/2005 | Ballam | 703/14 |
| 7,257,786 | B1 * | 8/2007 | Kukula | 716/106 |
| 7,302,417 | B2 * | 11/2007 | Iyer | 706/19 |
| 7,448,004 | B1 * | 11/2008 | Brown | 716/106 |
| 7,493,247 | B2 * | 2/2009 | Memmi | 703/14 |
| 7,643,979 | B2 | 1/2010 | Hong et al. | |
| 7,673,261 | B2 * | 3/2010 | Adir et al. | 716/106 |
| 7,711,536 | B2 * | 5/2010 | McNamara | 703/14 |

(Continued)

OTHER PUBLICATIONS

Abraham, J.A., "Chapter 22. Introduction to Formal Verification", Nov. 14, 2011, Department of Electrical and Computer Engineering, The Univeristy of texas at Austin, EE 360R—Computer Aided IC Design., pp. 1-44.*

(Continued)

Primary Examiner — Stacy Whitmore
(74) Attorney, Agent, or Firm — Kenyon & Kenyon LLP

(57) ABSTRACT

A system, method, and computer program product for automatically generating equivalent assertions in different forms for different verification tools, which may be analog or digital. A user submits a set of logic assertions that, if unclocked, are converted to clocked assertions by generating and skewing clocks to ensure simulator uniformity. A stimulus is generated, perhaps at random, or input. A test bench is either input or synthesized. For each verification tool, the test bench is simulated and simulation results are captured. An assertion status difference engine evaluates result differences between the verification tools, and identifies and outputs differences indicating a significant inconsistency. Errors in verification tool implementation and user assertion coding can be detected. The simulators used may include SPICE and Verilog, or any other simulators that differ in type, simulation algorithm, input format, or vendor implementation.

20 Claims, 10 Drawing Sheets

(56) References Cited

U.S. PATENT DOCUMENTS

| | | | |
|---|---|---|---|
| 7,810,056 B1 | 10/2010 | Garg et al. | |
| 7,958,475 B2* | 6/2011 | Khan | 716/109 |
| 8,056,037 B2* | 11/2011 | Koehl et al. | 716/113 |
| 8,234,617 B2 | 7/2012 | Chetput et al. | |
| 8,359,559 B2* | 1/2013 | Yang et al. | 716/106 |
| 8,413,088 B1* | 4/2013 | Armbruster et al. | 716/106 |
| 8,423,934 B1* | 4/2013 | Foster et al. | 716/107 |
| 8,554,530 B1 | 10/2013 | O'Riordan et al. | |
| 8,572,529 B2* | 10/2013 | Zawalski et al. | 716/106 |
| 2004/0163059 A1 | 8/2004 | Subbarayan | |
| 2005/0044512 A1* | 2/2005 | Lockyear et al. | 716/1 |
| 2006/0271904 A1* | 11/2006 | Emerson et al. | 716/18 |
| 2007/0011631 A1 | 1/2007 | Fine et al. | |
| 2007/0168896 A1 | 7/2007 | Park et al. | |
| 2008/0059928 A1 | 3/2008 | Takei et al. | |
| 2008/0082946 A1* | 4/2008 | Zilic et al. | 716/5 |
| 2008/0098339 A1 | 4/2008 | Chan | |
| 2008/0104556 A1 | 5/2008 | Yamada | |
| 2009/0019406 A1 | 1/2009 | Endoh et al. | |
| 2009/0064065 A1 | 3/2009 | Ikeda et al. | |
| 2009/0150136 A1 | 6/2009 | Yang | |
| 2010/0070937 A1 | 3/2010 | Nishide | |
| 2010/0169853 A1 | 7/2010 | Jain et al. | |
| 2011/0161898 A1 | 6/2011 | Chauhdry et al. | |
| 2011/0185282 A1* | 7/2011 | Mahmood et al. | 715/744 |
| 2012/0198399 A1* | 8/2012 | Safarpour et al. | 716/106 |
| 2012/0198411 A1 | 8/2012 | Bhushan et al. | |
| 2013/0019216 A1* | 1/2013 | Vasudevan et al. | 716/106 |

OTHER PUBLICATIONS

Anderson, Jacob, et al., "Leveraging Assertion Base VErification by Using Magellan", 2005, SNUG, pp. 1-18.*

Bhattacharya, P., et al., Assertion Based Verification in Mixed Signal Design, Oct. 17, 2011, EETimes. pp. 1-7.*

Mukhopadhyay, R, et al., "Instrumenting AMS Assertion Verification on Commercial Platforms", 2009. National Semiconductor Corp., pp. 1-47.*

IBM, "Using Formal Methods to Verify Complex Designs", 2007. IBM. pp. 1-11.*

Cadence Platform Application Note, "The Role of Assertions in Verification Methodologies—Using Assertions in a Simulation Environment", Feb. 2003, http://www.cadence.com/rl/Resources/application_notes/CDN_Assertions_in_Verification_Methodologies.pdf.

* cited by examiner

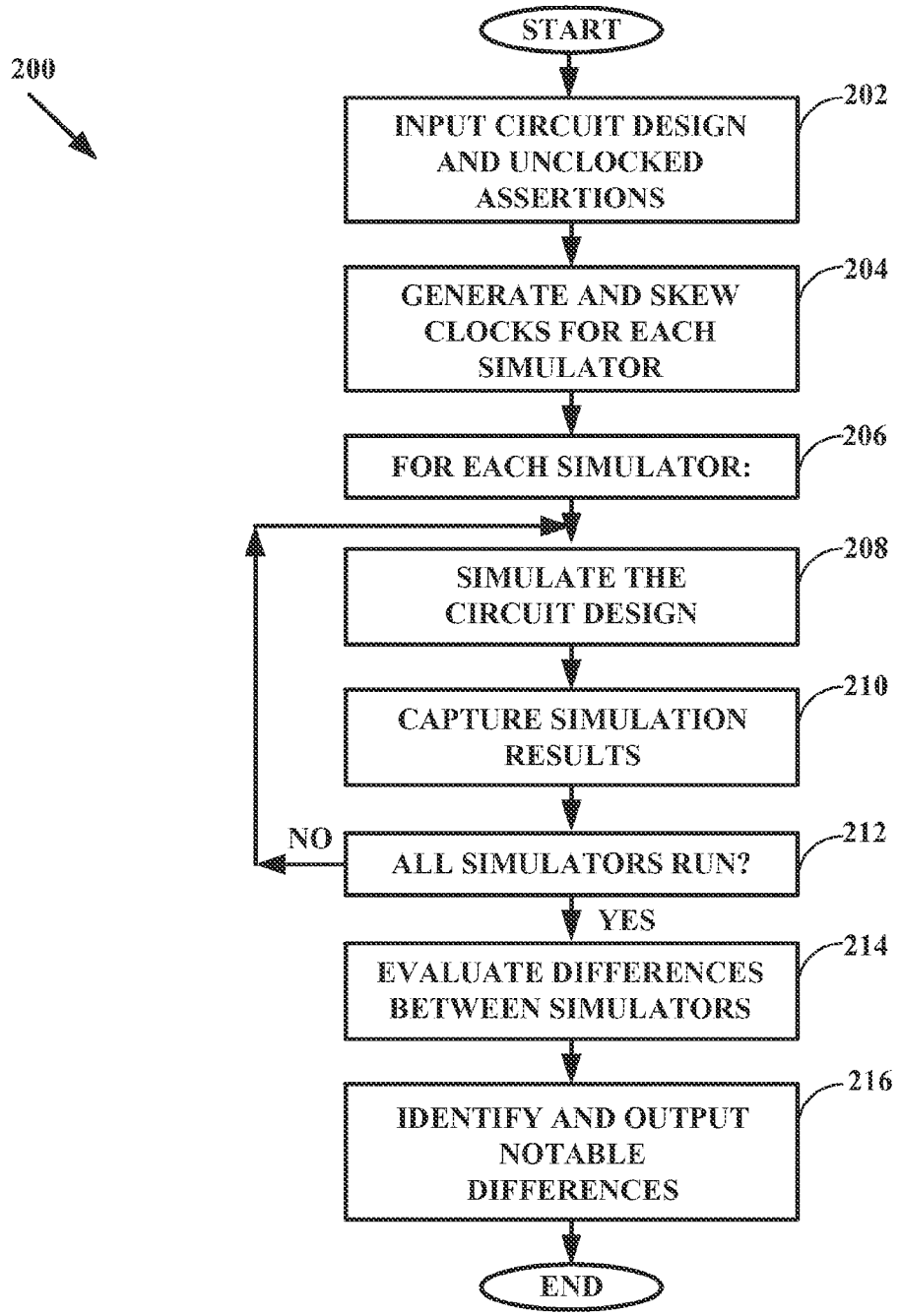

FIG. 3 simulator lang=SPICE v__A__ (__A__ 0) vsource type=bit val0=0 val1=3 delay=-5n rise=0.05n fall=0.05n
+ period=10n data="11111100111100011"

v__B__ (__B__ 0) vsource type=bit val0=0 val1=3 delay=-5n rise=0.05n fall=0.05n
+ period=10n data="00011010100010011"

v__C__ (__C__ 0) vsource type=bit val0=0 val1=3 delay=-5n rise=0.05n fall=0.05n
+ period=10n data="01110111110000001"

v__D__ (__D__ 0) vsource type=bit val0=0 val1=3 delay=-5n rise=0.05n fall=0.05n
+ period=10n data="01001000010101101"

v__E__ (__E__ 0) vsource type=bit val0=0 val1=3 delay=-5n rise=0.05n fall=0.05n
+ period=10n data="01000101111001101"

v__F__ (__F__ 0) vsource type=bit val0=0 val1=3 delay=-5n rise=0.05n fall=0.05n
+ period=10n data="11010011011100000"

v__G__ (__G__ 0) vsource type=bit val0=0 val1=3 delay=-5n rise=0.05n fall=0.05n
+ period=10n data="11001100011000100"

v__H__ (__H__ 0) vsource type=bit val0=0 val1=3 delay=-5n rise=0.05n fall=0.05n
+ period=10n data="10111100001001110"

FIG. 4

```
module top;
//declare bits
reg [7:0] bits;
wire __H__;
assign __H__ = bits[0];
wire __G__;
assign __G__ = bits[1];
wire __F__;
assign __F__ = bits[2];
wire __E__;
assign __E__ = bits[3];
wire __D__;
assign __D__ = bits[4];
wire __C__;
assign __C__ = bits[5];
wire __B__;
assign __B__ = bits[6];
wire __A__;
assign __A__ = bits[7];
initial begin
# 0 bits = 8'b10000111;
# 10 bits = 8'b10111110;
# 10 bits = 8'b10100001;
# 10 bits = 8'b11100101;
# 10 bits = 8'b11010011;
# 10 bits = 8'b10101011;
# 10 bits = 8'b01100100;
# 10 bits = 8'b00101100;
# 10 bits = 8'b11111010;
# 10 bits = 8'b10001111;
# 10 bits = 8'b10010100;
# 10 bits = 8'b01000000;
# 10 bits = 8'b00011001;
# 10 bits = 8'b00011011;
# 10 bits = 8'b11000001;
# 10 bits = 8'b11111000;
# 5 $finish;
end
```

FIG. 5 v_clk_ (_clk_ 0) vsource type=bit val0=0 val1=3 delay=-5n rise=0.05n fall=0.05n
+ period=5n data="010101010101010101010101010101"

FIG. 6

```
reg __clk__ ;
initial begin
#0   __clk__ = 1'b0;
#1   __clk__ = 1'b1;
#5   __clk__ = 1'b0;
#5   __clk__ = 1'b1;
// snipped
#5   __clk__ = 1'b0;
#5   __clk__ = 1'b1;
end
```

FIG. 7 timedom tran errpreset=liberal maxstep=1n start=-5n stop=155n assert_0 assert psl="assert always ('V(__A__) > 0.5' ->'V(__B__) > 0.5' until 'V(__C__) > 0.5') @('timer(0n, 10n )');" message="assert_0 PSL failed" level=warning assert_4 assert psl="assert always ('V(__A__) > 0.5' -> ('V(__B__) > 0.5' before_ 'V(__C__) > 0.5')) @('timer(0n, 10n )');" message="assert_4 PSL failed" level=warning assert_5 assert psl="assert always (('V(__A__) > 0.5' -> 'V(__B__) > 0.5') until 'V(__C__) > 0.5') @('timer(0n, 10n )');" message="assert_5 PSL failed" level=warning assert_6 assert psl="assert always ({ {'V(__A__) > 0.5'}; {'V(__B__) > 0.5';'V(__C__) > 0.5'} }) @('timer(0n, 10n )');" message="assert_6 PSL failed" level=warning assert_7 assert psl="assert always (({'V(__A__) > 0.5';[*2];'V(__B__) > 0.5'} |=> {'V(__C__) > 0.5'})) @('timer(0n, 10n )');" message="assert_7 PSL failed" level=warning assert_8 assert psl="assert always ({'V(__A__) > 0.5'[*]} |=> {'V(__B__) > 0.5'}) @('timer(0n, 10n )');" message="assert_8 PSL failed" level=warning assert_9 assert psl="assert always ({'V(__A__) > 0.5'[+]} |=> {'V(__B__) > 0.5'}) @('timer(0n, 10n )');" message="assert_9 PSL failed" level=warning assert_10 assert psl="assert always ({'V(__A__) > 0.5'[*3]} |=> {'V(__B__) > 0.5'}) @('timer(0n, 10n )');" message="assert_10 PSL failed" level=warning assert_11 assert psl="assert always ({'V(__A__) > 0.5'[*3:inf]} |=> {'V(__B__) > 0.5'}) @('timer(0n, 10n )');" message="assert_11 PSL failed" level=warning assert_12 assert psl="assert always ({'V(__A__) > 0.5'[*0:3]} |=> {'V(__B__) > 0.5'}) @('timer(0n, 10n )');" message="assert_12 PSL failed" level=warning assert_13 assert psl="assert always ({'V(__A__) > 0.5'[*2:3]} |=> {'V(__B__) > 0.5'}) @('timer(0n, 10n )');" message="assert_13 PSL failed" level=warning

FIG. 8

//psl assert_0: assert always (__A__ -> __B__ until __C__) @(posedge __clk__);

//psl assert_4: assert always (__A__ -> (__B__ before__ __C__)) @(posedge __clk__);

//psl assert_5: assert always ((__A__ -> __B__) until __C__) @(posedge __clk__);

//psl assert_6: assert always ({ {__A__}; {__B__; __C__} }) @(posedge __clk__);

//psl assert_7: assert always (({__A__;[*2];__B__} |=> {__C__})) @(posedge __clk__);

//psl assert_8: assert always ({__A__[*]} |=> {__B__}) @(posedge __clk__);

//psl assert_9: assert always ({__A__[+]} |=> {__B__}) @(posedge __clk__);

//psl assert_10: assert always ({__A__[*3]} |=> {__B__}) @(posedge __clk__);

//psl assert_11: assert always ({__A__[*3:inf]} |=> {__B__}) @(posedge __clk__);

//psl assert_12: assert always ({__A__[*0:3]} |=> {__B__}) @(posedge __clk__);

//psl assert_13: assert always ({__A__[*2:3]} |=> {__B__}) @(posedge __clk__);

SYSTEM AND METHOD FOR SIMULATOR ASSERTION SYNTHESIS AND DIGITAL EQUIVALENCE CHECKING

CROSS REFERENCE TO RELATED APPLICATIONS

The present application is a non-provisional of and claims priority to U.S. Ser. No. 61/800,142, filed on Mar. 15, 2013, entitled "System And Method For Simulator Assertion Synthesis And Digital Equivalence Checking", which is hereby incorporated by reference in its entirety. A related application entitled "System And Method For Automated Simulator Assertion Synthesis And Digital Equivalence Checking", attorney docket number 13335/12143B, is filed herewith and is also hereby incorporated by reference in its entirety. The present application is related to U.S. Pat. No. 8,234,617, entitled "Method And System For Re-Using Digital Assertions In A Mixed Signal Design", issued on Jul. 31, 2012; this related patent is hereby incorporated by reference in its entirety.

BACKGROUND

Verification is an important step in the process of designing and creating an electronic product. Verification ensures that the electronic design will work for its intended purpose, and is usually performed at several stages of the electronic design process. Circuit designers and verification engineers use different methods and analysis tools to verify circuit designs, including simulation. Simulation dynamically verifies a design by monitoring computed behaviors of the design with respect to test stimuli.

As analog content increases in integrated circuit design, the complexity of mixed signal design and verification also increases. As a result, electronic design automation (EDA) tool vendors are introducing additional design and verification approaches into broader design flows. Assertion Based Verification (ABV) helps designers and verification engineers improve design quality and reduce time to market. ABV techniques are becoming more widespread in design and verification, particularly those using Property Specification Language (PSL) and SystemVerilog Assertions (SVA).

PSL is a language developed for specifying formally verifiable properties or assertions about hardware designs. SVA is the SystemVerilog assertion specification language, which is similar to PSL. SystemVerilog is a combined hardware description language and hardware verification language based on extensions to Verilog, which in turn is a standardized hardware description language used to model electronic systems. VHDL is another hardware description language known in the art. For ease of reference, this application will simply refer to "Verilog" throughout to encompass hardware description languages and hardware verification languages in general, in contrast to SPICE type circuit simulations.

Assertions may be annotations in a design that perform built-in "checks" of logical properties during verification, and are often implemented as statements that describe expected design behavior. An assertion may thus be a predicate (i.e., a true-false statement) placed at a point to indicate that the designer thinks that the predicate is always true at that point. Assertions allow designers to express complex relationships among design components.

For example, an assertion may be used to verify that an assumption made during a design implementation remains valid when the design is verified. If an assertion evaluates to false during verification, an assertion failure results. Such a failure may draw attention to the location of the logical inconsistency. A major advantage of this technique is that when an error does occur it may be detected immediately and directly, rather than through its often obscure side effects. Since an assertion failure usually reports the design code location, debugging is simplified. Assertions may be entered by the circuit designer or added by a separate process.

Assertions may be verified statically or dynamically. Dynamic verification involves applying a stimulus to a circuit design, often a time-varying stimulus processed by a simulator. Simulators thus may be considered to be effectively synonymous with dynamic verification tools. When a verification tool processes the design, the assertions may be extracted as part of a test bench and used in checking the circuit for assertion violations. Assertions may be written both during development of the design and in the verification environment. Both designers and verification engineers may be involved in identifying design requirements and capturing them as assertions.

Assertions have historically been used for digital circuit designs, but EDA vendors are beginning to add such digital technologies to dynamic analog verification tools. Different simulator types have inherent differences that make it difficult to automatically determine whether an assertion implemented in one simulator is functionally equivalent to another simulator's implementation. For example, the SPICE type simulators widely used in analog circuit simulation were not originally designed for assertion based verification techniques with PSL/SVA assertions. ABV implementation in such analog simulators is by necessity sufficiently different from the digital implementation to make direct comparisons difficult or impossible.

Further, SPICE and Verilog simulators/verification tools represent analog and digital circuit objects, respectively, in their own domains. Verilog handles digital signals versus the circuit branch currents and node voltages used by SPICE. Verilog uses event driven simulation algorithms versus the SPICE continuous time algorithms, resulting in possible timing differences. Differences may also occur due to mistranslation of assertions by a user, e.g., in translating from Verilog to SPICE, or vice versa.

Differences may also be due to faulty implementation of assertion language specifications in one or both simulators by a vendor. Use of one simulator, e.g., a SPICE tool, as a "golden" standard against another simulator, e.g., a Verilog verification tool, may provide insight into any significant simulation implementation differences. Comparison of user-written assertions in otherwise equivalent test benches may also be valuable.

Ensuring the coherence and correlation of ABV implementations and reported assertion results across various widely used simulation platforms has proven challenging. These requirements are necessary both internally to software makers for quality assurance purposes, and externally by users for assertion authoring purposes. Therefore the circuit design industry requires a tool to automatically compare simulated circuit results as determined by different simulators, which may be analog or digital. Accordingly, the inventor has developed such a tool, to verify simulation consistency and detect errors in simulator implementations.

BRIEF DESCRIPTION OF THE DRAWINGS

FIG. 2 is a flowchart of a verification tool comparator operation, according to an embodiment.

FIG. 3 is a SPICE stimulus listing, according to an embodiment.

FIG. 4 is a Verilog stimulus listing, according to an embodiment.

FIG. 5 is a SPICE clock source listing, according to an embodiment.

FIG. 6 is a Verilog clock source listing, according to an embodiment.

FIG. 7 is a SPICE assertion listing, according to an embodiment.

FIG. 8 is a Verilog assertion listing, according to an embodiment.

DETAILED DESCRIPTION

Figure 1:
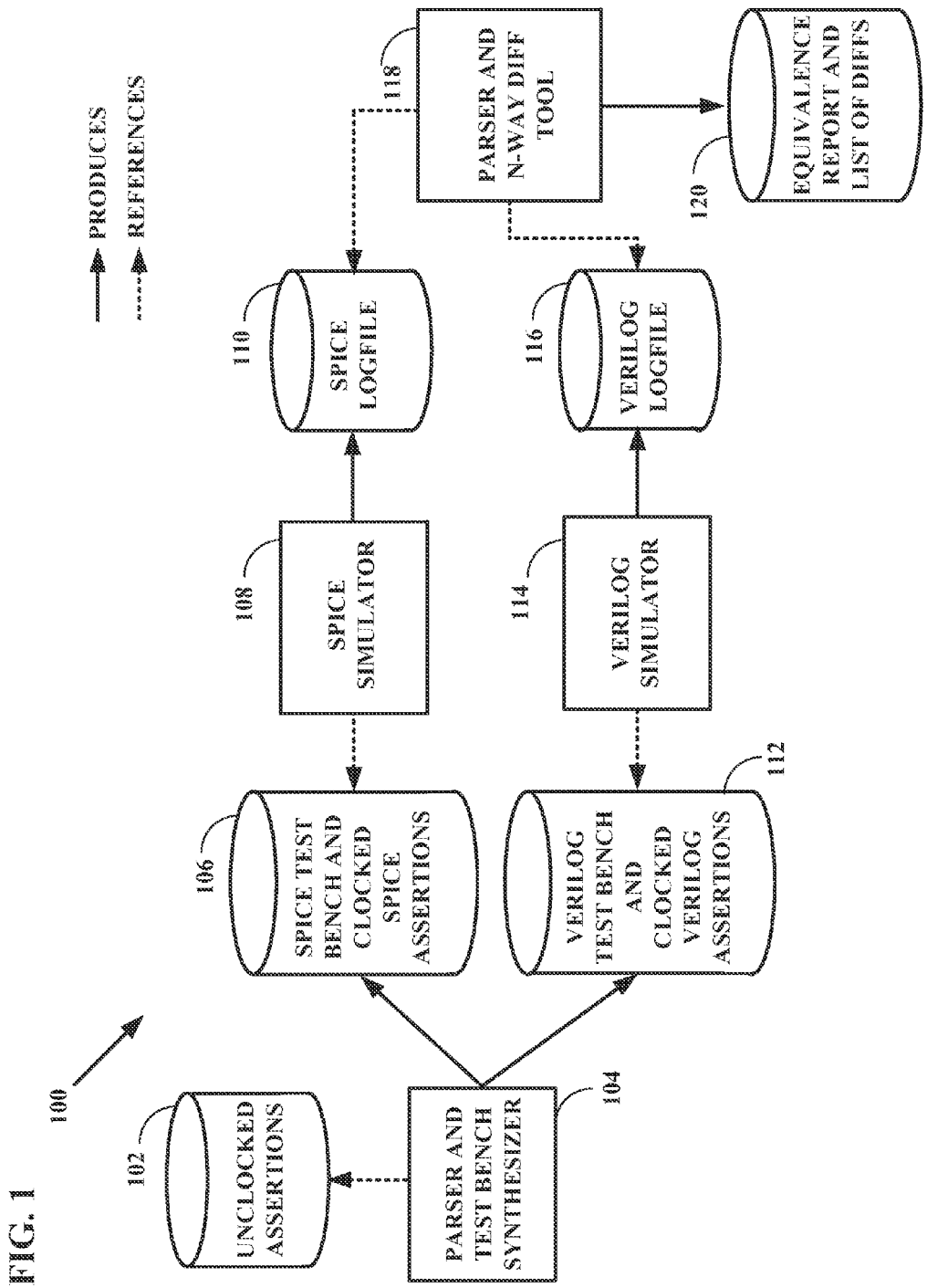
FIG. 1 is an architectural diagram of a verification tool comparator, according to an embodiment.

This application presents a process for generating equivalent assertions in different forms and directed toward different verification tools. The application also presents a tool for automatically comparing simulated circuit results as determined by different simulators, which may be analog or digital. Some of the key differences of assertion implementation across analog and digital simulators are described. The application further describes a novel system that allows assertion equivalence to be dynamically proven in spite of these differences.

Embodiments of the present invention may implement a test bench synthesis process. A user may submit a set of unclocked logic assertions that may be automatically converted to a set of clocked assertions targeted at different simulators (e.g., SPICE and Verilog/VHDL) that may employ different simulator host languages. Embodiments may synthesize test benches for each simulator to convert the unclocked input assertions to clocked assertions, and to skew the assertion clocks as needed to ensure simulator uniformity. Embodiments may randomly generate a stimulus (e.g., a logical bit pattern), and convert that stimulus to the form required for each simulator. The synthesis process ensures both analog and digital simulators are driven by the equivalent logical stimuli and evaluate the same logical assertions, even with very different analog and digital representations.

Each simulator may process the circuit design, and embodiments may capture the resulting outputs. An assertion status difference engine may evaluate differences in simulation results across the implementations, while automatically compensating for output differences in timing and syntax. Embodiments may note significant inconsistencies for review by designers.

Users may also manually edit the assertions in a randomly generated test bench synthesized by the test bench synthesis process described above. Thus users may dynamically prove the assertions' equivalence in otherwise logically identical analog and digital test benches.

While many of the concepts between simulators are the same, some of the key implementation differences between SPICE assertions and standard digital assertions leading to direct comparison difficulties include:

different syntaxes in capturing/writing the assertions
different approaches to clocking assertions
different namespaces for objects referenced by the assertions
different syntax reporting assertions in simulator logs
different handling of (time) multi-cycle failures in simulator logs, and
differences in timing. (e.g., continuous time versus discrete time).

Description of these differences is provided in more detail below.

An intelligent automated assertion test bench synthesis and advanced "diff" (assertion difference compute engine) capability is required to handle the above implementation differences. Embodiments with such capability ensure the analog (e.g., SPICE) implementation of PSL/SVA assertion based verification matches the digital (e.g., Verilog or VHDL) implementation. This capability may also dynamically prove assertion equivalence across the various analog and digital simulator platforms for a variety of randomly generated stimuli.

Differences in Capturing/Writing and Clocking the Assertions

As an example of the challenges faced in spanning different simulators, a description of the notational differences between SPICE and Verilog is provided. Examples could also have been based on VHDL and SVA, or on other hardware description languages as are known in the art. An exemplary Verilog PSL assertion generally provides a name/label, a verification directive, a specification of when to check the directive, a property to be checked, and a clocking point:
//psl assert_13: assert always ({_A_[*2:3]}|=>{_B_}) @(posedge_clk_);

PSL assertions are declarative in nature. Every PSL assertion may be evaluated on every simulation timestep (if unclocked) or every sample point (if clocked), and all assertions are evaluated concurrently. Asynchronous or synchronous behavior may be expressed. Asynchronous checks may be performed upon every simulation timestep. To create asynchronous PSL assertions, one simply omits the clocking expression. The real power of PSL comes in however for sequential circuits or sampled data systems that have the checks performed synchronously, i.e., at well-defined points (e.g., sample points, co-incident with circuit clocks, etc.) during the simulation. For synchronous checking in a SPICE type simulator, the PSL clock or sampling event may be defined using a value threshold crossing, a sampling event on periodic time points after an initial delay, or a sampling event on any one of a user supplied number of time points.

In contrast with the above Verilog example, a SPICE assertion designed to function similarly is now shown:
assert_13 assert psl="assert always ({'V(_A_)> 0.5'[*2:3]}|=>{'V(_B_)>0.5'}) @('timer(0n, 10n)');" message="assert_13 PSL failed" level=warning The two examples above denote significant differences in assertion specification and clocking in otherwise identical logical assertions. The SPICE case shows how the assertion may be captured in a PSL string parameter, as part of the SPICE "assert" statement in one embodiment. The PSL string parameter internally contains single-quoted substrings for the Boolean layer terms. Those substrings in turn may contain valid simulator expressions that reference SPICE objects, analog quantities, miscellaneous analog functions, and ultimately binary operators in order to ensure a binary result as befits the Boolean Layer. The SPICE object reference may distinguish between node voltage access, e.g., V(_A_) to access the voltage on node _A_, and branch currents, e.g., I(br1) to access the current through branch br1, using voltage/current access functions V( ) and I( ) respectively.

Other mechanisms for analog quantity access may also be used by the analog simulator. Due to the requirement to differentiate between voltage and current quantities, direct reference to node names (e.g., _A_, without the access function) is not possible in the SPICE case. The thresholding operations (e.g., >0.5, etc.) to reduce the analog expression to a Boolean quantity are needed for SPICE, since the native simulation objects such as currents and voltages are not by themselves Boolean.

SPICE is a continuous time simultaneous equation based simulator, i.e., it is not event driven, and so does not represent clock signals/events in the digital sense. Since SPICE is a structural language, and not behavioral, it does not natively contain language operators like "posedge", or other event modeling concepts. Hence, the clocking of PSL/SVA assertions for SPICE is by necessity different from the clocking expressions used in the digital case. It is more common in the analog world to have timed expressions, so clocking via a timer( ) function, or via a times( ) array, or via a threshold crossing event may be employed in the SPICE case, which again do not have a direct equivalence in the digital case.

Differences in Naming Rules

SPICE signal naming rules are also different from Verilog naming rules. One commonly encountered example is the handling of non-alphanumeric characters in object names. In Verilog, the full identifier name is prefixed by a backslash, and terminated by a white space. Any characters between the backslash and white space are considered as part of the name. In SPICE however, individual nonalphanumeric characters are individually escaped, hence the term bus<3>ab would be represented as:
SPICE: bus\<3\>ab
Verilog: \bus3ab Clashes with language keywords also occur, e.g., "subckt" is an illegal node name in SPICE, but perfectly legal in Verilog.

In order to be internally self-consistent (with other reporting in the same file), the assertion failure outputs reported in the different simulator log files also differ from each other. For example:

SPICE Case:
Warning from SPICE at time=100.025 ns during transient analysis 'timedom'.
WARNING (SPICE-4060): assert_13: assert_13 PSL failed. Expression 'assert always ({'V(_A_)> 0.5'[*2:3]}|=>{'V(_B_)>0.5'}) @('timer(0n, 10n)');' is getting false.

Verilog case:
ncsim: *E,ASRTST (./irun_stim.v,89): (time 101 NS) Assertion top.assert_13 has failed (3 cycles, starting 81 NS)
//psi assert_12: assert always ({_A_[*0:3]}|=> {_B_}) @(posedge_clk_);

Given that a SPICE simulator is non-event driven, differences in timing also occur. In the examples above, assert_13 has failed in both simulators, but the failure occurs at time 100.025 ns in the SPICE case, and 101 ns in the Verilog case. These times cannot be directly compared, though they are close.

In order to handle all the above differences in assertion detail when performing automated testing, a mechanism is required by which assertions and dynamic test benches may be generated for the different simulators from a single source. This mechanism should intelligently "diff" the outputs from the different simulators in order to prove equivalence.

Referring now to FIG. 1, an overview of the architecture of the assertion proving system 100 is shown, according to an embodiment. Unclocked assertions may be stored in database 102, and referenced by the parser and test bench synthesizer 104. For the exemplary SPICE path, the synthesized SPICE test bench and clocked SPICE assertions may be stored in database 106, which may be referenced by SPICE simulator 108 that in turn may generate SPICE logfile 110. For the exemplary Verilog path, the synthesized Verilog test bench and clocked Verilog assertions may be stored in database 112, which may be referenced by Verilog simulator 114 that in turn may generate Verilog logfile 116. The parser and N-way "diff" tool 118 may reference the SPICE and Verilog logfiles 110 and 116, and may produce an equivalence report and list of noted differences, which may be stored in database 120.

A user may first create a file of unclocked assertions in a simple format. A sample of such a listing is reproduced below:
assert always a→b until c;
assert always a→next_a[4:6](b→next c);
assert always a→next_a[4:6](b);
assert always a→next(next b);
assert always a→(b before_c);
assert always (a→b) until c;
assert always {{a}; {b;c}};
assert always ({a; [*2];b}|=>{c});
assert always {a[*]}|=>{b};
assert always {a[+]}|=>{b};
assert always {a[*3]}|=>{b};
assert always {a[*3:inf]}|=>{b};
assert always {a[*0:3]}|=>{b};
assert always {a[*2:3]}|=>{b};

The unclocked assertions file may list assertions in either PSL or SVA format for example. Comments may be included by leading # symbols (similar to Shell/Python comment syntax) or // syntax (which is more C/C++ like, or Verilog-like).

Note that input assertions are unclocked in this embodiment. Assertions may support different directives such as "assert", "assume", "cover", etc. They may also include optional "always" and "never", clauses. The above example is in PSL-Verilog syntax, but support is also provided for SVA syntax.

The embodiments may parse the above assertions with a simple parser; one embodiment uses regular-expression-based parsing, which has proven sufficient for simple cases. More advanced parsers such as LR parsers, or parsers generated by parser generators may equally be used. The parse tree produced may break down the assertions into directives (assert, cover, assume, . . . ), foundational language temporal operators (always, never, etc.) and then assertion properties (such as (a→b) until c). The properties themselves may then be further decomposed to determine the Boolean layer signal names (a, b, c, . . . ).

Different test benches may then be constructed based on the parsed information. For example, a test bench may be synthesized for a Verilog simulator, and another for the SPICE simulator. Details on the test bench contents are given further below. The test benches may contain appropriate signal declarations, logically identical randomly generated stimulus vectors for those signals (with the same logical contents though via very different representations), appropriately skewed clock signals for synchronization purposes (again, different representations though with equivalent timing), and a set of synthesized, clocked assertions. The assertions may be clocked with the synthesized clock in the digital case, or with an appropriately constructed analog timer( ) event in the SPICE case. Thresholding operations may also be automatically added to the signal terms in the SPICE case, to convert from analog to digital in the Boolean Layer. While very different in nature and appearance, the logical and timing operations of the test benches are essentially identical by construction.

The embodiments may then invoke the simulators as sub-process operations, with each simulator directed to handle its correspondingly synthesized test bench. The simulations may be run to apply the stimulus vectors to the signals referenced by the assertions. The assertions may be evaluated by each individual simulator, with pass/fail status at each of the clocking events correspondingly reported to the each simulator's log file.

Finally, the log files may be parsed by an N-way diffing tool; a typical value of N is 2 (one for SPICE, and one for Verilog), though additional simulator representations can also be added to give N>2. This diffing tool may be invoked as a sub-process. The parsing operations may be limited to parsing assertion failures (wherein other log entries are discarded), taking both the assertion failure times and failing assertion labels/names into account from each simulator's output log. Individual per-simulator lists may be constructed where for each reported failure time the list of failing assertions at that time may be stored by name. Multi-cycle failures in the digital simulator (e.g., Verilog) case may be expanded into a single failure for each of the appropriate clock events represented in the overlap period, so that they are represented with the same failure count as in the SPICE case. SPICE internally does this expansion before reporting, i.e., SPICE does not report multi-cycle failures as a single failure.

During the "diff" operations, the list of assertions that fail at the various different times may be gathered into a global data structure, with an entry per simulator. The full list of times, a union across all simulators of all the times at which assertion failures are listed, may be determined. Small timing differences, due to the analog nature of time, may be "snapped" upward to the nearest nanosecond above (e.g., via a mathematical ceiling operation), such that per-nanosecond granularity comparisons may subsequently be made. Other granularities may equally be used. In a second pass, at each reported "snapped" simulation time in the union set, the list of assertion failures for each individual simulator may be compared, and any differences such as unexpected/missing assertion failures may be listed. In other words, if any one simulator reported a failure but the other(s) did not do so at any given simulation time in the union, this difference may be noted.

Two tables may be produced in the final output report, in which differences in assertion status may be listed sorted chronologically on a per-time basis, and also on a per-individual assertion name/label basis. Finally, simulation waveforms may also be produced by the simulators, which further facilitate debugging.

The results:

An example output report produced by the system is listed below:
Generating sample3.psl for seed 5 . . .
running SPICE
running Verilog
* DIFFS BY TIME *
121 NS SPICE Verilog
assert_0 1 0
131 NS SPICE Verilog
assert_0 1 0
* DIFFS BY ASSERT ID *
assert_0 SPICE Verilog
121 NS 1 0
131 NS 1 0

Note that while a number of assertions were checked across the two simulator implementations, the first of these (assert_0, listed for convenience below) was found to exhibit some differences in behavior:
assert always a→b until c;

In one embodiment, the difference was due to an implementation bug in one of the simulators.

Repeating the experiment with manual insertion of parentheses to work around a precedence/associativity bug, as per the below example, showed that this form was equivalent in both simulators:
assert always (a→b) until c;

The output difference report in the equivalent case is provided as follows. The 'cat' command lists the contents of the file sample3.psl, which is an example of the unclocked assertions file 102 of FIG. 1.
% cat sample3.psl
assert always (a→b) until c;
assert always a→next_a[4:6](b→next c);
assert always a→next_a[4:6](b);
assert always a→next(next b);
assert always a→(b before_c);
assert always (a→b) until c;
assert always {{a}; {b;c}};
assert always ({a; [*2];b}|=>{c});
assert always {a[*]}|=>{b};
assert always {a[+]}|=>{b};
assert always {a[*3]}|=>{b};
assert always {a[*3:inf]}|=>{b};
assert always {a[*0:3]}|=>{b};
assert always {a[*2:3]}|=>{b};
Next, the system is invoked to generate the test benches and random stimuli, invoke the simulators, and "cliff" the results. In this case, no differences are observed:
% ../src/tools/bin/auto_run.py
Generating sample3.psl for seed 5 . . .
running SPICE
running Verilog
* DIFFS BY TIME *
* DIFFS BY ASSERT ID *

Referring now to FIG. 2, a flowchart of the simulator comparator operation 200 is shown, according to an embodiment. At 202, a user may input a circuit design and unclocked assertions. At 204, the simulator comparator may generate and skew clocks for each simulator. Skewing refers to adding offsets to the relative clock timings to make the assertion failure times as close to each other as possible, which facilitates the operation of the difference engine. At 206, a loop may be initiated for each selected simulator to process the input circuit design. At 208, each selected simulator may simulate the circuit design, and in 210 the simulator comparator may capture the simulation results from each simulator. At 212 a determination may be made as to whether all selected simulators have processed the input circuit design; if not, then the simulation loop may be repeated, otherwise execution proceeds. At 214, the simulator comparator may evaluate differences between the outputs generated by each of the simulators. At 216, the simulator comparator may identify and output (including graphically) notable differences in simulation results.

Test Bench Details

The test bench generator may synthesize per-simulator test benches that contain equivalent information as follows:
 Top level modules (as appropriate).
 Signal Declarations.
 (Verilog Wires, SPICE circuit nodes) in which the assertion property signals (a, b, c, . . . ) may be represented. Within the test benches, each of the signals may be name mapped (i.e., converted) to a form that is legal in the target simulator language's name space, and these signals may be driven with a set of stimulus vectors. An example mapping might be from "a" to "_A_" (the underscores may help with avoiding clashes with language keywords such as module, subckt, etc.).

Stimulus Vectors.

The stimulus vectors themselves may be initially generated in a random manner, e.g., user inputs may provide a number of samples to generate, and an initial random seed. The stimulus vectors may be stored in an internal format-agnostic data structure that contains a list of the random Boolean values, arranged on a per-signal basis. This shared internal data structure may be consulted when generating the test benches. Corresponding formatted host language constructs (for example behavioral Verilog and continuous assignment in the Verilog case, analog three volt effectively piecewise linear (PWL) voltages in the SPICE case) may be synthesized such that the logical contents of the stimulus is identical, even though the representations are very different (e.g., one is digital, one is analog, etc.). Corresponding listings for each simulator are shown in FIGS. 3 and 4. Note that the digital 'bits' matrix listing is essentially the transpose of the 'data' matrix used by the vsource elements in the SPICE simulator.

Clock Signals.

Clock signals may also be generated to facilitate waveform generation and eyeballing later on. Again, a digital clock signal may be generated in the digital case, via delayed signal assignments such as a 10 ns effective period (other periods may equally be used), and an analog PWL signal may be generated in the SPICE case, with a similar period to the digital case. Appropriate timing skew offsets may be included (e.g., a negative 5 ns delay in the SPICE case, +1 ns in the Verilog) in order to ensure the rising clock edges line up with the stimulus waveforms as closely as possible across both simulators. This signal generation is depicted below and in FIGS. 5 and 6.

SPICE clock source listing:
v_clk_(_clk_0) vsource type=bit val0=0 val1=3 delay=−5n rise=0.05n fall=0.05n+period=5n data="01010101010101010101010101010101"

Verilog clock source listing:
reg_clk_;
initial begin
0_clk_=1'b0;
1_clk_=1'b1;
5_clk_=1'b0;
5_clk_=1'b1;
// snipped
5_clk_=1'b0;
5_clk_=1'b1;
end Assertions.

Finally, the assertions themselves may be generated on a host language basis. For the analog/SPICE case, the Boolean terms may be generated with the appropriate voltage access functions V( ) or current access functions I( ) as appropriate, and a threshold comparison operator may be automatically inserted in order to convert the 3-volt signal voltages to logic 1/0 equivalences. Appropriate clocking expressions may be synthesized to correspond to the previously synthesized digital clock signals, to ensure similar timing. In one embodiment, for the SPICE case a timer( ) function may be used with a certain period, e.g., 10 ns, with the initial delay appropriately set to ensure alignment with the digital equivalents. The timer( ) function may be implemented with a proprietary language provided by the current assignee that is used by many customers in conjunction with a commercially available SPICE simulator. Other languages with similar timing constructs may similarly be used (e.g., Verilog-A also has a timer( ) function). In the digital case a simple @(posedge clk) may be used. SPICE and Verilog assertion listings are shown in FIGS. 7 and 8, respectively.

Usage Scenario

In addition to the embodiments described above, embodiments are also provided that enable users to directly input or edit the stimulus, and either directly input or edit the synthesized test benches. These embodiments may be best described in a scenario in which designers adapt and modify an available input design specification.

In this example, the designers begin with commonly executable specifications in RTL format, for which they need to produce a sized transistor-level netlist exhibiting equivalent behavior to the RTL. They also begin with a file of PSL assertions, which were used to initially verify the RTL. They examine the first assertion that was used to verify the RTL:
assert always (req→next (ack)) @(posedge(clk));

This assertion checks that an acknowledge signal (ack) will pulse within once clock cycle of a request (req) signal, and will raise a flag/error out in situations where the ack pulse is missing after the second req. First, they create a file 'ackreq.psl' containing just the assertion, with the clocking term removed, and using simple placeholders (a, b) etc. for their req/ack expressions for now.
assert always (a→next (b));

Next, they run the debug environment script:
% ../src/tools/bin/auto_run.py
Generating ackreq.psl for seed 5 . . .
running SPICE
running Verilog
* DIFFS BY TIME *
* DIFFS BY ASSERT ID *

They now find the 'auto_run.py' script has created SPICE and Digital Verilog test benches in which the same logical assertion shows up in the appropriate forms. The script has also invoked the SPICE and Verilog simulators on these test benches, and verified that no assertion differences were encountered. They take a look at the SPICE test bench, which contains the same random stimulus bit pattern that was used in the Verilog test bench case, only all converted to analog voltages, in addition to an analog voltage-based encoding of their PSL assertion:
% cat spice_stim.scs
simulator lang=SPICE
v_A_ (_A_0) vsource type=bit val0=0 val1=3 delay=−5n rise=0.05n fall=0.05n+period=10n data="1111110011100011"
v_B_ (_B_0) vsource type=bit val0=0 val1=3 delay=−5n rise=0.05n fall=0.05n+period=10n data="0001101010010011"
v_C_ (_C_0) vsource type=bit val0=0 val1=3 delay=−5n rise=0.05n fall=0.05n+period=10n data="0111011110000001"
v_D_ (_D_0) vsource type=bit val0=0 val1=3 delay=−5n rise=0.05n fall=0.05n+period=10n data="0100100010101101"
v_E_ (_E_0) vsource type=bit val0=0 val1=3 delay=−5n rise=0.05n fall=0.05n+period=10n data="0100010111001101"
v_F_ (_F_0) vsource type=bit val0=0 val1=3 delay=−5n rise=0.05n fall=0.05n+period=10n data="1101001101100000"
v_G_ (G_0) vsource type=bit val0=0 val1=3 delay=−5n rise=0.05n fall=0.05n+period=10n data="1100110011000100"
v_H_ (_H_0) vsource type=bit val0=0 val1=3 delay=−5n rise=0.05n fall=0.05n+period=10n data="1011110001001110"

v_clk_ (clk_0) vsource type=bit val0=0 val1=3 delay=−5n rise=0.05n fall=0.05n+period=5n data="01010101010101010101010101010101"
timedom tran errpreset=liberal maxstep=1n start=−5n stop=155n assert_0 assert psl="assert always (('V(_A_)>0.5'→next ('V(_B_)>0.5'))) @('timer(0n, 10n)');" message="assert_0 PSL failed" level=warning The 'auto_run.py' script has taken care of the analog PSL syntax issues, and generated a SPICE analog PSL assertion that is equivalent to their digital assertion. It has also generated a test pattern that they can use from now on to dynamically compare the assertions. They compare the analog assertion with the Verilog test bench digital case using Unix grep:
% grep assert_0 verilog_stim.v
//psl assert_0: assert always ((_A_→next (_B_))) @(posedge_clk_);

They notice that the Verilog digital test bench used a_clk_ signal (posedge) to sample the assertion terms, while the analog one used a 'timer(0, 10n)' as its clocking expression.

In order to be fully timing aware, they next decide to modify their analog assertion to use 'xcross' based clocking events, i.e., to trigger on an actual threshold crossing of the analog clock signal. So, they take a copy of their SPICE test bench and make an edit, so that the assertion now looks like this:
assert_0 assert psl="assert always (('V(_A_)>0.5'→next ('V(_B_)>0.5'))) @('xcross(V(_clk_)−1.5)');" message="assert_0 PSL failed" level=warning Their intent is that this will allow their assertion to be triggered like their original digital RTL assertion, i.e., whenever the clock signal rises (in this case, when it rises above 1.5 volts, which is halfway between the full clock excursion of 0 to 3 volts.) So, they run their SPICE simulation now:
% spice ackreq.scs=log spice.log
... <snipped> ...

They check the SPICE log to see if some assertion failures occurred (as expected). Their assertion does raise some red flags in SPICE, which they can see with the following Unix grep command:
% grep "assert_0 PSL failed" spice.log
WARNING (SPICE-4060): assert_0: assert_0 PSL failed. Expression 'assert always (('V(_A_)>0.5'→next ('V(_B_)>0.5'))) @('xcross(V(_clk_)−1.5)');' is getting false.
WARNING (SPICE-4060): assert_0: assert_0 PSL failed. Expression 'assert always (('V(_A_)>0.5'→next ('V(_B_)>0.5'))) @('xcross(V(_clk_)−1.5));' is getting false.
WARNING (SPICE-4060): assert_0: assert_0 PSL failed. Expression 'assert always (('V)_A_)>0.5'→next ('V(_B_)>0.5'))) @('xcross(V(_clk_)−1.5));' is getting false.
WARNING (SPICE-4060): assert_0: assert_0 PSL failed. Expression 'assert always (('V(_A_)>0.5'→next ('V(_B_)>0.5'))) @('xcross(V(_clk_)−1.5)');' is getting false.
WARNING (SPICE-4060): assert_0: assert_0 PSL failed. Expression 'assert always (('V(_A_)>0.5'→next ('V(_B_)>0.5'))) @('xcross(V(_clk_)−1.5)');' is getting false.
WARNING (SPICE-4060): assert_0: assert_0 PSL failed. Expression 'assert always (('V(_A_)>0.5'→next ('V(_B_)>0.5'))) @('xcross(V(_clk_)−1.5)');' is getting false.
WARNING (SPICE-4060): assert_0: assert_0 PSL failed. Expression 'assert always (('V(_A_)>0.5'→next ('V(_B_)>0.5'))) @('xcross(V(_clk_)−1.5)');' is getting false.
WARNING (SPICE-4060): assert_0: assert_0 PSL failed. Expression 'assert always (('V(_A_)>0.5'→next ('V(_B_)>0.5'))) @('xcross(V(_clk_)−1.5)');' is getting false.

To be sure it is working properly however, they look more carefully at the logs from both SPICE and Verilog. The logs are lengthy, which makes this task difficult. Further, Verilog complains about multiple-cycle failures such as the one below:
ncsim: *E,ASRTST (./verilog_stim.v,79): (time 21 NS) Assertion top.assert_0 has failed (2 cycles, starting 11 NS)
//psl assert_0: assert always ((_A_→next (_B_))) @(posedge_clk_);

SPICE never complains about these multi-cycle events. SPICE also does not list the time at which an assertion fails in the same line as the assertion failure itself. Instead it shows something like the sublisting below in which assertion failure is on a very separate line from the time-based warning.
Line 100: Warning from spice at time=20.025 ns during transient analysis 'timedom'.
... <more lines snipped> ...
Line 109: WARNING (SPICE-4060): assert_0: assert_0 PSL failed. Expression 'assert always (('V(_A_)>0.5'→next ('V(_B_)>0.5'))) @('xcross(V(_clk_)−1.5)');' is getting false.

Not only are things a little different now and they cannot do grep-based or line-by-line based comparisons, they also notice that the SPICE timing is just a little off compared to the digital timing. SPICE reports failures at 20.025 ns for example, which is close to the digital timing of 21 ns reported by the verilog.log file, but not an exact match.

Manually trying to compare these logs would be difficult, but the assertion difference computation engine can intelligently compare SPICE logfiles versus Verilog logfiles looking specifically for assertion differences. The engine also does some rounding/snapping on the analog failure report timing to snap them to a 1 ns timing grid so that more direct comparisons can be enabled. They run the difference engine, and see the following output indicating that something is clearly wrong, as apparently SPICE is asserting far more often than Verilog:

| % ../src/tools/assert_diff.py -s spice.log -i verilog.log | | |
|---|---|---|
| *** DIFFS BY TIME *** | | |
| 6 NS | SPICE | Verilog |
| assert_0 | 1 | 0 |
| 16 NS | SPICE | Verilog |
| assert_0 | 1 | 0 |
| 46 NS | SPICE | Verilog |
| assert_0 | 1 | 0 |
| 86 NS | SPICE | Verilog |
| assert_0 | 1 | 0 |
| 96 NS | SPICE | Verilog |
| assert_0 | 1 | 0 |
| *** DIFFS BY ASSERT ID *** | | |
| assert_0 | SPICE | Verilog |
| 6 NS | 1 | 0 |
| 16 NS | 1 | 0 |
| 46 NS | 1 | 0 |
| 86 NS | 1 | 0 |
| 96 NS | 1 | 0 |

Since they now have an idea of the timing (to the nearest nanosecond) where things looked wrong, they begin to debug their xcross event. They notice that it appears to be clocking the assertion more often than they had originally expected. They go back to the SPICE documentation for xcross, and find that by default it generates an analog sampling event whenever the signal expression crosses the threshold value in either direction. So their xcross based clock is generating PSL sampling events on descending threshold crossings in addition to ascending threshold crossings. That potentially explains the extra assertion failures. They modify their xcross based clock from
assert_0 assert psl="assert always (('V(_A_)>0.5'→next ('V(_B_)>0.5'))) @('xcross(V(_clk_)−1.5);" message="assert_0 PSL failed" level=warning to
assert_0 assert psl="assert always (('V(_A_)>0.5'→next ('V(_B_)>0.5'))) @('xcross(V(_clk_)−1.5, +1)');" message="assert_0 PSL failed" level=warning adding in the "+1" term to make it equivalent to a rising edge detection. Now, they re-run their SPICE simulation again, and compare the assertion report with that from Verilog:
% spice ackreq.scs=log spice.log
% ../src/tools/assert_diff.py -s spice.log -i verilog.log
* DIFFS BY TIME *
* DIFFS BY ASSERT ID *

This time, there are no differences. The SPICE assertion is ready to be used on the real custom transistor implementation of the logic. The designers only need to replace _A_ and _B_ with 'req' and 'ack' respectively.

However, one designer realizes that the 1.5 volt threshold used for the clock sampling event is not going to work on his 1.2 volt logic design. So, the designer re-codes the xcross term to use a 0.6 volt logic threshold instead of 1.5 v, and correspondingly modifies the synthesized SPICE test bench to use a 1.2 volt clock instead of a 3 volt clock:
v_clk_ (_clk_0) vsource type=bit val0=0 val1=1.2 delay=−5n rise=0.05n+fall=0.05n period=5n data="010101010101010101010101010101"
assert_0 assert psl="assert always (('V(_A_)>0.5°→next ('V(_B_)>0.5'))) @('xcross(V(_clk_)−0.6, +1)');" message="assert_0 PSL failed" level=warning
The designer then re-runs the simulations, and re-runs the assertion difference engine, and finds that all is well.
% spice ackreq.scs=log spice.log
% ../src/tools/assert_diff.py -s spice.log -i verilog.log
* DIFFS BY TIME *
* DIFFS BY ASSERT ID *

One designer then wonders how to make the assertion more generic so that it will work on the next design which will employ dynamic voltage scaling as a low power design technique. In this case, it seems that having fixed/hardcoded thresholds may not be a good idea, so the designer may want to tweak the assertion a little further. assert_0 assert psl="assert always (('V(_A_)>V(VDD)/2.0°→next ('V(_B_)>V(VDD)/1.0'))) @('xcross(V(_clk_)−V(VDD)/2.0, +1)');" message="assert_0 PSL failed" level=warning The designer modifies the Boolean terms so that instead of comparing values with a 0.5 volt hardcoded threshold, they are compared instead against a dynamically computed value that is one half of the VDD voltage. Expressions like 'V(_A_)>V(VDD)/2.0' should fit the bill, which leverage the analog simulator's capability to dynamically access a node voltage for a node such as the VDD node. This should allow the time-varying voltage behavior to be factored into the assertion. Once again, the designer re-runs the simulations but unexpectedly finds there are some diffs:

% spice ackreq.scs =32log spice.log
% ../src/tools/assert_diff.py -s spice.log -i verilog.log
* DIFFS BY TIME *

| 31 NS | SPICE | Verilog |
|---|---|---|
| assert_0 | 1 | 0 |
| 41 NS | SPICE | Verilog |
| assert_0 | 1 | 0 |
| 61 NS | SPICE | Verilog |
| assert_0 | 1 | 0 |
| 111 NS | SPICE | Verilog |
| assert_0 | 1 | 0 |
| 151 NS | SPICE | Verilog |
| assert_0 | 1 | 0 |
| *** DIFFS BY ASSERT ID *** | | |
| assert_0 | SPICE | Verilog |
| 31 NS | 1 | 0 |
| 41 NS | 1 | 0 |
| 61 NS | 1 | 0 |
| 111 NS | 1 | 0 |
| 151 NS | 1 | 0 |

Looking at the timing again, one designer notices that SPICE is reporting some failures that Verilog is not. The designer looks at the assertion waveforms, and timing of the events where SPICE reported failures that Verilog did not. The problem was due to a typo in the manually edited expression to calculate the threshold dynamically when comparing the analog voltage of the _B_ signal:
assert_0 assert psl="assert always (('V(_A_)>V(VDD)/2.0'→next ('V(_B_)>V(VDD)/1.0'))) @('xcross(V(_clk_)−V(VDD)/2.0, +1)');" message="assert_0 PSL failed" level=warning The designer notices that instead of dividing the VDD value by 2.0 in the V(_B_) term, s/he was accidentally dividing by 1.0 due to a typo, and as a result the manually edited term V(_B_)>V(VDD)/1.0 would never evaluate to be true (as node B could never exceed the VDD value).

The designers realize that this intelligent diffing tool, along with the automatically constructed test bench it generates, is extremely useful as they gradually modify the original digital RTL assertions to become fully 'analog aware' so they can now work in the case of a custom digital netlist implemented in schematic transistors. Further, they realize that their new assertion can potentially catch errors in future low power designs also, for example in the case where power domains aren't connected up properly.

The designers now apply the assertion towards the transistor level netlist for the real custom circuit. They simply substitute their signals (req, ack) in place of the A and B terms they have been working with so far, fix the typo to divide by 2.0 again by changing the expression to V(_B_)>V(VDD)/2.0, and go on to use this analog PSL assertion to catch two real bugs in the custom transistor netlist design.
assert_0 assert psl="assert always (('V(req)>V(VDD)/2.0'→next ('V(ack)>V(VDD)/2.0'))) @('xcross(V(_clk_)−V(VDD)/2.0, +1)');" message="assert_0 PSL failed" level=warning They repeat the process with some more of the initial RTL assertions, and realize they have generated an analog verification IP library that is re-usable for future custom digital transistor-level designs with similar specifications. By verifying the custom netlist using PSL assertions in SPICE, they had caught some bugs that otherwise would have made it through the layout.

They look at their final PSL assertion, and compare it with their digital original:
assert_0 assert psl="assert always (('V(req)>V(VDD)/2.0'→next ('V(ack)>V(VDD)/2.0'))) @('xcross(V(_clk_)−V(VDD)/2.0, +1)');" message="assert_0 PSL failed" level=warning
assert always (req→next (ack)) @(posedge(clk));

They realize that while the analog PSL is more complex/verbose than the digital one, it is also more powerful due to its ability to be re-used in designs where voltages vary as a function of time.

Figure 9:
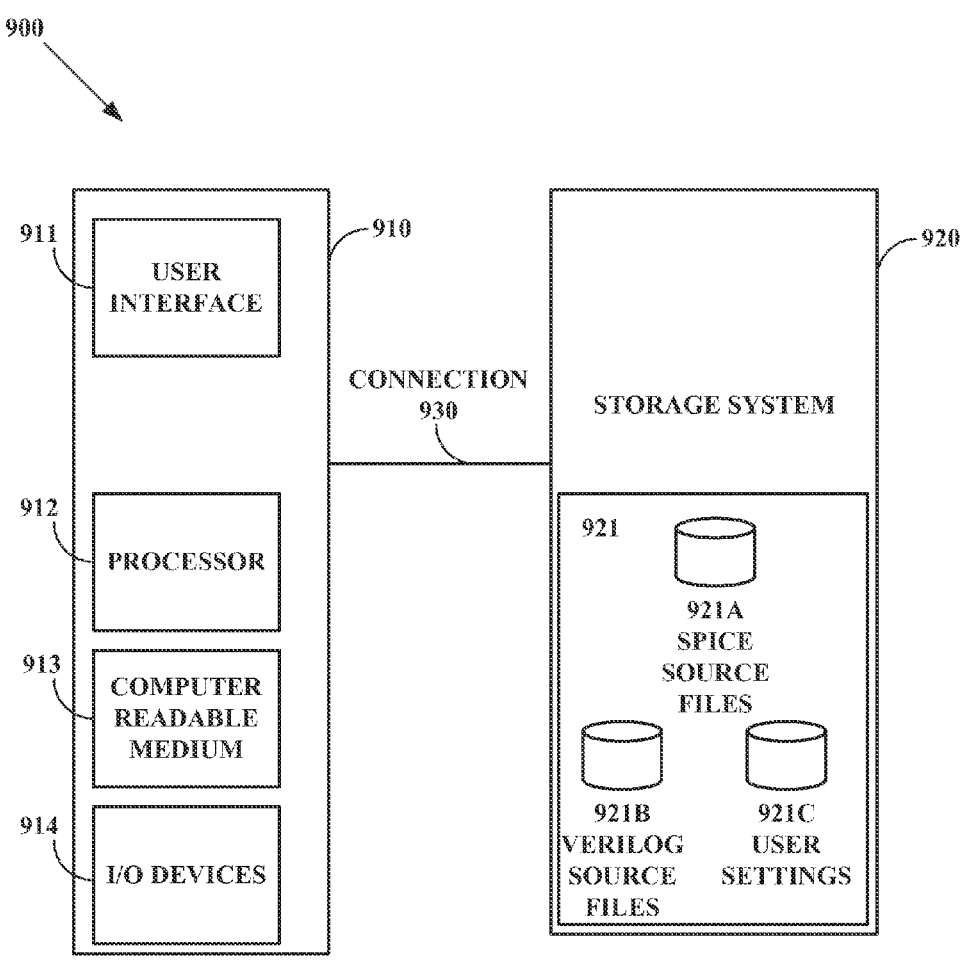
FIG. 9 is a block diagram of a verification tool comparator system, according to an embodiment.

Referring now to FIG. 9, a block diagram of an exemplary simulator comparator system 900 is shown according to an embodiment. This system may provide simulator functionality for any of the methods described above. A user may access the simulator comparator system 900 through a standalone client system, client-server environment, or a network environment. System 900 may comprise one or more clients or servers 910, one or more storage systems 920, and a connection or connections 930 between and among these elements.

Client 910 may execute instructions stored on transitory or non-transitory computer readable medium 913 with processor 912, that provide a user interface 911 that may allow a user to access storage system 920. The instructions may be part of a software program or executable file that may operate electronic design automation (EDA) software. Client 910 may be any computing system, such as a personal computer, workstation, mobile computer, or other device employing a processor which is able to execute programming instructions. User interface 911 may be a GUI run in a user-controlled application window on a display. A user may interact with user interface 911 through one or more input/output (I/O) devices 914 such as a keyboard, a mouse, or a touch screen.

Storage system 920 may take any number of forms, including but not limited to a server with one or more storage devices attached to it, a storage area network, or one or a plurality of non-transitory computer readable media. Databases 921 may be stored in storage system 920 such that they may be persistent, retrieved, or edited by the user. Databases 921 may include SPICE source files 921A, Verilog source files 921B, and a user input database 921C for example. These databases may be kept as separate files or systems, or may be merged together in any appropriate combination.

Only one client 910 is shown connected to storage system 920 through connection 930, which may be a simple direct wired or wireless connection, a system bus, a network connection, or the like, to provide client 910 with access to storage system 920. In another aspect, connection 930 may enable multiple clients 910 to connect to storage system 920. The connection may be part of a local area network, a wide area network, or another type of network, again providing one or more clients with access to storage system 920. Depending on system administrator settings, client 910's access to system storage 920 or to other clients may be limited.

Figure 10:
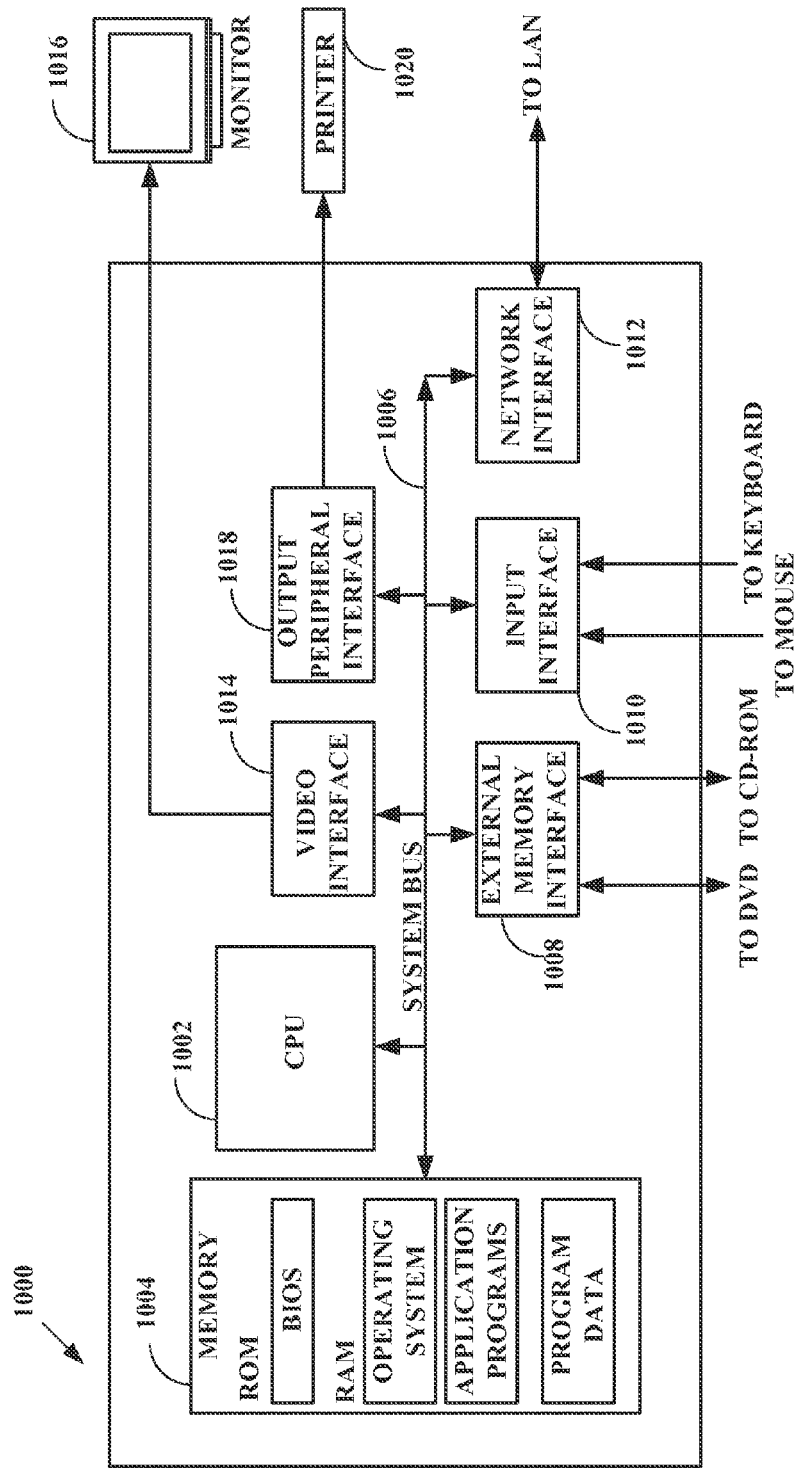
FIG. 10 is a diagram of a computer system, according to an embodiment.

FIG. 10 depicts a computer system comprising the structure for implementation of the embodiments described above. Computer system 1000 comprises a central processing unit (CPU) 1002 that processes data stored in memory 1004 exchanged via system bus 1006. Memory 1004 typically includes read-only memory, such as a built-in operating system, and random-access memory, which may include an operating system, application programs, and program data. Computer system 1000 also comprises an external memory interface 1008 to exchange data with a DVD or CD-ROM for example. Further, input interface 1010 may serve to receive input from user input devices including but not limited to a keyboard and a mouse. Network interface 1012 may allow external data exchange with a local area network (LAN) or other network, including the internet. Computer system 1000 also typically comprises a video interface 1014 for displaying information to a user via a monitor 1016. An output peripheral interface 1018 may output computational results and other information to output devices including but not limited to a printer 1020.

Computer system 1000 may comprise for example a personal computer or an engineering workstation, each of which is widely known in the art and is commonly used for integrated circuit simulation and verification tasks, along with software products commercially available for performing computer-aided integrated circuit verification tasks including simulation. Computer system 1000 may also comprise a mobile computer, including for example a tablet computer or a smart phone. The computer system of FIG. 10 may for example receive program instructions, whether from existing software products or from embodiments of the present invention, via a computer program product and/or a network link to an external site.

For purposes of explanation, specific nomenclature is set forth to provide a thorough understanding of the present invention. Description of specific applications and methods are provided only as examples. Various modifications to the embodiments will be readily apparent to those skilled in the art and the general principles defined herein may be applied to other embodiments and applications without departing from the spirit and scope of the invention. Thus the present invention is not intended to be limited to the embodiments shown, but is to be accorded the widest scope consistent with the principles and steps disclosed herein.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described with reference to operations that may be performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments may serve as the code segments directing a computing device to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While particular embodiments of the present invention have been described, it is to be understood that various different modifications within the scope and spirit of the invention are possible. The invention is limited only by the scope of the appended claims.

What is claimed is:

1. A processor-implemented method comprising:
using a processor:
inputting at least one user-supplied assertion, a stimulus, and a test bench;
for each of a plurality of different verification tools, simulating the test bench and capturing simulation results;
evaluating result differences between the verification tools with an assertion status difference engine that dynamically determines assertion equivalences; and
identifying and outputting differences indicating an assertion inconsistency.

2. The method of claim 1 wherein the user-supplied assertion is unclocked.

3. The method of claim 1 wherein the user-supplied assertion is clocked.

4. The method of claim 1 wherein the user-supplied assertions are written in at least one of Property Specification Language (PSL) and SystemVerilog Assertions (SVA).

5. The method of claim 1 wherein the different verification tools are one of analog and digital, all digital, and all analog.

6. The method of claim 1 wherein the different verification tools are of event driven and continuous time types.

7. The method of claim 1 wherein the different verification tools include at least two of SPICE, VHDL, Verilog, and SystemVerilog.

8. The method of claim 1 wherein at least one of the stimulus and the test bench are synthesized.

9. The method of claim 1 wherein the inconsistency is from at least one of a verification tool implementation error and a user assertion coding error.

10. A non-transitory computer readable medium storing instructions that, when executed by a processor, perform a method comprising:
inputting at least one user-supplied assertion, a stimulus, and a test bench;
for each of a plurality of different verification tools, simulating the test bench and capturing simulation results;
evaluating result differences between the verification tools with an assertion status difference engine that dynamically determines assertion equivalences; and
identifying and outputting differences indicating an assertion inconsistency.

11. The medium of claim 10 wherein the user-supplied assertion is unclocked.

12. The medium of claim 10 wherein the user-supplied assertion is clocked.

13. The medium of claim 10 wherein the user-supplied assertions are written in at least one of Property Specification Language (PSL) and SystemVerilog Assertions (SVA).

14. The medium of claim 10 wherein the different verification tools are one of analog and digital, all digital, and all analog.

15. The medium of claim 10 wherein the different verification tools are of event driven and continuous time types.

16. The medium of claim 10 wherein the different verification tools include at least two of SPICE, VHDL, Verilog, and SystemVerilog.

17. The medium of claim 10 wherein at least one of the stimulus and the test bench are synthesized.

18. The medium of claim 10 wherein the inconsistency is from at least one of a verification tool implementation error and a user assertion coding error.

19. A system comprising:
a memory storing executable instructions; and
a processor executing instructions to:
input at least one user-supplied assertion, a stimulus, and a test bench;
for each of a plurality of different verification tools, simulate the test bench and capture simulation results;
evaluate result differences between the verification tools with an assertion status difference engine that dynamically determines assertion equivalences; and
identify and output differences indicating an assertion inconsistency.

20. The system of claim 19 wherein at least one of the stimulus and the test bench are synthesized.

* * * * *